(12) United States Patent
Huang et al.

(10) Patent No.: US 7,482,387 B2
(45) Date of Patent: Jan. 27, 2009

(54) METHOD FOR PROCESSING SPENT ION-EXCHANGE RESINS

(75) Inventors: Ching-Tsuen Huang, Taoyuan Hsien (TW); Tzeng-Ming Liu, Jhongli (TW); Jiing-Guang Tyen, Banchiao (TW)

(73) Assignee: Institute of Nuclear Energy (TW)

( * ) Notice: Subject to any disclaimer, the term of this patent is extended or adjusted under 35 U.S.C. 154(b) by 0 days.

(21) Appl. No.: 10/778,184

(22) Filed: Feb. 17, 2004

(65) Prior Publication Data
US 2005/0182147 A1  Aug. 18, 2005

(51) Int. Cl.
*C08J 5/20* (2006.01)
(52) U.S. Cl. .............................. 521/26; 521/28; 521/36
(58) Field of Classification Search .................. 521/26, 521/28, 36
See application file for complete search history.

(56) References Cited

U.S. PATENT DOCUMENTS 4,770,783 A * 9/1988 Gustavsson et al. ............ 588/3

* cited by examiner

*Primary Examiner*—Robert D. Harlan
(74) *Attorney, Agent, or Firm*—Lowe Hauptman Ham & Berner, LLP

(57) ABSTRACT

A method for processing spent ion-exchange resins is provided by reducing the volume of the spent ion-exchange resins through a wet oxidation process and solidifying the residual wet oxidation slurry and the waste solution with high efficiency. The method comprises of using barium hydroxide as a neutralization agent to adjust pH of the reaction solution so as to drive away ammonia from the solution, and as a conversion agent to convert sulfuric acid and sulfate obtained in the reaction into barium sulfate. The process can solidify the wet oxidation residue slurry and waste solution with high efficiency.

14 Claims, 2 Drawing Sheets

METHOD FOR PROCESSING SPENT ION-EXCHANGE RESINS

BACKGROUND OF THE INVENTION

1. Field of the Invention

The invention relates to a method for processing spent ion-exchange resins, and in particular, to a method for processing spent ion-exchange resins by reducing the volume of the spent ion-exchange resins through a wet oxidation process and using barium hydroxide to adjust pH of the wet oxidation reaction solution. The method of the invention is applicable mainly to various cleaning treatments in nuclear power plants and in other relative fields.

2. Description of the Prior Art

Current nuclear power plants are operated based on light water reactors that use light water as the coolant of the reactor and as the neutron moderator. If there is corrosive ion present in the reactor water, the corrosion to the reactor will increase and activation products may be produced such that the radioactivity in the reactor system may increase to an extent that the neutron economy might be lowered due to the out of control of neutron capture reactions. In order to overcome these potential problems, ion-exchange resins had been used extensively in the nuclear power plant, including, for example, cleaning treatment of reactor water for supplying de-mineralized reactor water; removing from the reactor water contaminants such as neutron activation products and fission products that are escaped from nuclear fuel elements; lowering the oxygen content in the coolant; controlling contents of the corrosion inhibitor and chemical additives, and the like. Further, ion exchange resins are useful as well in the treatment of wastewater from the nuclear power plant.

For increasing the effective surface area, powdery ion exchange resins other than bead resins are also used in the nuclear power plant. The specific surface area of the powdery ion exchange resin is approximately 100 times than that of the bead ion exchange resin, and it is a kind of very fine powder. They are used usually for coating the filter elements where, in addition to the function of ion exchange, they can remove small solid beads suspended in the water.

After declining of the ion exchange capability of the ion exchange resins or increasing of the radioactivity due to contamination of nuclides in the ion exchange resins, the bead ion exchange resin must be regenerated. After being regenerated and re-used for allowable times, the bead ion exchange resin should be discarded as a radioactive waste. On the contrary, since the powdery ion exchange resin will retrain a great amount of solid impurities therein once in use, it is no more subjected to regeneration and is discarded as waste after being used once. According to the survey conducted by US Electric Power Research Institute for 1982-1985, regarding the fraction of spent resins in wet waste, resin waste from the Boiling Water Rector (BWR) nuclear power plant contained 50% of powdery resin and 25% of bead resin; while resin waste from Pressurized Water Reactor (PWR) nuclear power plant contained 7% of powdery resin and 44% of bead resin. As in Taiwan, resin waste from BWR nuclear power plant contained about 30% of powdery resin and about 11% of bead resin; while resin waste from PWR nuclear power plant contained about 1% of powdery resin and about 23% of bead resin.

The spent ion exchange resin needs to be stabilized for the safety of final disposal. For this purpose, it is usually solidified with agent such as cement, polymers, pitch and the like. The performance of the solidification is characterized differently by the kind of agent used. In general, solidification with high polymers or pitch could result in less volume of the solidified products. However, polymers are expensive. The operation cost with polymers is eventually very expensive. In the other hand, pitch gives lower strength of solidified product and the product is combustible. In March 1997, a fire accident in Japan had been arisen due to solidification operation with pitch, which resulted in a severe nuclear accident. Solidification with cement is a simple and cheap operation. However, since the spent ion exchange resin after solidification still has ion exchange ability such that it can exchange with the calcium ion and the like in the solidified product to the extent of affecting its quality. Further, the solidified resin can absorb or release moisture and hence undergoes swelling or contraction. These phenomena will occur particularly in the bead ion exchange resin that, to the severe extent, might result in the swelling or cracking of the solidified product. All of these will limit greatly the loading rate of the spent ion exchange resin in the cement-solidified product such that a bulky solidified product might be yielded after solidification. In view of the increment of the final disposal cost, the direct solidification of spent ion exchange resin is no more economical.

With the treatment of spent ion exchange resins, two objects are expected mainly as volume reduction and stabilization. Processes for treating spent ion exchange resins may be classified into two types, i.e., the dry process and the wet process. The dry process includes incineration, vitrification and pyrolysis, while the wet process includes acid hydrolysis, oxidative hydrolysis and supercritical water oxidation etc. Of these, incineration process is the earliest developed one and had been implemented commercially in some countries. For incineration, it is done typically in a manner of mixing the spent bead ion exchange resins with other combustible waste in order to control the release concentration of $SO_x$, $NO_x$ or other hazardous gas. Release control of radioactive nuclides is also a critical problem to be solved in incineration process. Unless the discharge of volatile nuclides such as, for example, carbon-14, tritium, cesium-137 and the like can be avoided, nuclides must be removed at first from the spent resin to lower its radioactivity before incineration.

In vitrification process, the corrosion of the material is the main problem, since the vitreous molten mass of ion exchange resins could exhibit strong corrosion activity at high temperature. Currently, a variety of melting furnace techniques for vitrification is under development. Among these, the cold wall crucible fusion process developed by SGN Company of France has less corrosion problem and is said could be a promising vitrification technique. The Molten Metal Technology (MMT) of USA had developed a Quantum-Catalytic Extraction Process (Q-CEP) that, in a closed reactor, all the volatile components in ion exchange resins were decomposed into simple gases with molten iron having strong reducing activity, while non-volatile components were left as slag. In this way, effective volume reduction and stabilization could be obtained. The final solidified product in that process is a high active iron block containing sulfur, silicon, sodium and the like, and a special container is required for containing the same. The construction cost of the Q-CEP system is very high and it is not economic to construct a process plant with small capacity system. Further, the treatment left of the considerable amount of gaseous byproducts such as hydrogen sulfide and the like produced by that process could be a difficult problem.

ThermoChem Inc. of USA had developed a steam reforming process, comprising pyrolysis of ion exchange resins under elevated temperature and, meanwhile, generating a combustible gas useful as a fuel through reforming. This process has also a severe problem of materials corrosion, and its future needs to be demonstrated further. A process at its starting step of development is the SuperCritical Water Oxidation (SCWO) process. When decomposition products such as, for example, sulfuric acid, of ion exchange resins are present, the supercritical water of high temperature and pressure employed in that process exhibits similarly a high degree of corrosion that renders the material corrosion a severe problem. That process is still far away from practical use.

The British AEA Industry had developed successfully a wet oxidation process that is comprised of carrying out an oxidative decomposition of bead type spent ion exchange resins by using ferrous sulfate as the catalyst, aqueous hydrogen peroxide as the oxidant and lime hydrate as pH regulator at a temperature of about 100° C. and pH of 3-4 to decompose organic components into $CO_2$ and $H_2O$. It is reported that, for treating 40 kg of ion exchange resins, this process would consumed 160 kg of 50 wt % aqueous hydrogen peroxide, 1 kg of concentrated sulfuric acid, 6 kg of slime hydrate, and less than 0.5 kg of de-foaming agent.

Spent ion exchange resins generated in nuclear power plant includes the cation exchange resin of strong acid type and the anion exchange resin of strong basic type, each possessing different chemical properties. When carrying out a wet oxidation on a cation exchange resin of strong acid type and an anion exchange resin of strong basic type, the over-all reaction can be represented as eq. (1) and (2) respectively:

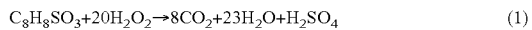

$$C_8H_8SO_3 + 20H_2O_2 \rightarrow 8CO_2 + 23H_2O + H_2SO_4 \qquad (1)$$

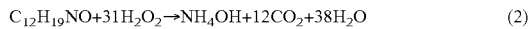

$$C_{12}H_{19}NO + 31H_2O_2 \rightarrow NH_4OH + 12CO_2 + 38H_2O \qquad (2)$$

As shown in the above two equations, as the ion exchange resin is oxidized, hydrogen carbon constituents are oxidized into $CO_2$ and $H_2O$. According to equation (1) and (2), one mole each of sulfonate group and quaternary amino group contained respectively in cation and anion exchange resins will be oxidized into one mole each of sulfuric acid and ammonium hydroxide, respectively. Sulfuric acid generated from the oxidation of cation exchange resins may, other than increasing the acidity of the solution, impart high corrosive property on the wet oxidation solution due to the presence of both sulfuric acid and hydrogen peroxide. This corrosive property may increase as the progress of the wet oxidation of the cation exchange resin. The wet oxidation of mixed cation and anion exchange resins produces both sulfuric acid and ammonium hydroxide, and therefore, involved also the following reaction between them, i.e.:

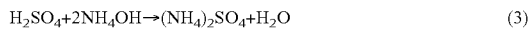

$$H_2SO_4 + 2NH_4OH \rightarrow (NH_4)_2SO_4 + H_2O \qquad (3)$$

The mole ratio of sulfuric acid to ammonium hydroxide in the waste solution of the wet oxidation will vary depending on the mole ratio of the cation exchange resin to the anion exchange resin that have undergone the wet oxidation. When the mole ratio of anion/cation exchange resin is equal to 2, the ammonium hydroxide and sulfuric acid produced will form into ammonium sulfate exactly corresponding to that ratio, and the pH of the solution will increase slightly at the end of the reaction. On the other hand, as the mole ratio >2, there will be excess of ammonium hydroxide; the pH of the waste wet oxidation solution will increase significantly. On the contrary, when the mole ratio <2, there will remain excess sulfuric acid and, accordingly, the pH will lower considerably.

In order to control the pH of the wet oxidation solution, addition of an acid or base might be necessary for adjusting as desired. Typically, lime (calcium hydroxide) or sodium hydroxide is added as the base. Addition of calcium hydroxide will convert sulfuric acid into calcium sulfate and results in the waste solution of wet oxidation contains mainly calcium sulfate. During the solidification of this waste solution, the calcium sulfate will react with $3CaO.Al_2O_3$ present in the cement, forms slowly ettrigite having low density, and renders the solidified product swell gradually to crack eventually, and consequently, a severe quality problem is caused. For alleviating this problem, loading rate of waste in the solidified product must be greatly lowered. This, however, will result in the great increment of the volume of the solidified waste. In addition, calcium sulfate in the waste solution is prone to crystallize and agglomerate to an extent of blocking the transportation pipes, deteriorating transportation and constituting a difficulty in operation.

Also, in the wet oxidation process of spent ion exchange resins, there is an aqueous condensate generated from the cooling of vapors from the wet oxidation reactor in certain quantity as much as that of $H_2O_2$ consumed. This condensate may contain a certain amount of nuclides, and also inevitably contain a small amount of organic substances, which, if not treated appropriately, may cause excessive high concentrations of nuclides and total organic carbon (TOC) to an extent that the condensation water could not be discharged or reused.

In view of the foregoing, current wet oxidation process for treating spent ion exchange resins possesses the major disadvantages including: (1) the reaction solution to be treated exhibits very high corrosion property that might cause a severe corrosion attack on the material; (2) the liquid waste generated contains mainly sulfuric acid and its salts that can not be solidified readily; thus the solidified product produced from the liquid waste is bulky that it might counterbalance almost the volume reduction effect achieved by the oxidation of ion exchange resins.

In view of overcoming the above-mentioned disadvantages, after studying extensively the inventor of this application had developed the invention accordingly.

SUMMARY OF THE INVENTION

Accordingly, one object of the invention is to provide a process for processing spent ion exchange resins on the purpose of reducing the volume of the ion exchange resins by wet oxidation.

Another object of the invention is to provide a process for processing spent ion exchange resins, characterized in that, after reducing the volume of the ion exchange resin via wet oxidation, the wet oxidation residue and the waste liquor slurry are solidified with high efficiency.

In an embodiment of the invention, the process for processing spent ion exchange resins comprises of carrying out the decomposition and oxidation of the ion exchange resin by using aqueous hydrogen peroxide as the oxidant, and increasing pH of the reaction solution with barium hydroxide, or lowering pH of the reaction solution with sulfuric acid. Referring to FIG. 1, a preferred embodiment of the invention comprises the following steps:

(1) adding ion exchange resins in a solution of ferrous sulfate and heating the solution with stirring at a temperature that is higher than 90° C. and lower than boiling point of the solution;

(2) adding aqueous hydrogen peroxide into the solution of (1) and adjusting pH of the resulting mixture with sulfuric acid or barium hydroxide to a range of pH suitable for wet oxidation;

(3) when the temperature increases to boiling point during the addition of aqueous hydrogen peroxide, allowing the solution boiling spontaneously, and, allowing the vapor thus generated together with $CO_2$ passing through a condenser, then collecting the condensed water and carrying out treatments to lower its TOC and concentration of nuclides, recycling or discharging the condensed water, while $CO_2$ can be released after passing through a HEPA filter;

(4) after adding sufficient aqueous hydrogen peroxide to complete the wet oxidation, adding barium hydroxide into the solution to increase pH of the solution, and forming barium sulfate with sulfate in the solution and at the same time, enabling ammonium ion escaping out of the solution as ammonium hydroxide or ammonia gas;

(5) allowing ammonium hydroxide or ammonia gas escaped out of the solution to pass through an ammonia dissociator to decompose them into hydrogen and nitrogen gases, and bringing said hydrogen gas to contact and react with air to form H2O; and (6) adding solidification agent to the slurry of (4) and mixing homogeneously, and then leaving it aside for solidifying.

In one embodiment of the invention, for stabilizing the wet oxidation solution smoothly, sulfuric acid is specifically selected as the acid, while barium hydroxide is specifically selected as the base for regulating pH, and particularly, barium hydroxide is employed as the neutralization agent. With these, following advantages can be obtained:

(1) Barium hydroxide can convert sulfuric acid and ammonium sulfate into barium sulfate, a solid that is insoluble and has a very high specific gravity (about 4.5). It exhibits a very high stability such that, after being embedded, it can act as the aggregate in the solidified product and can thus enhance the mechanical strength of the solidified product as well. (2) No ettrigite would be produced to incur the problem of swelling and cracking of the solidified product, and hence can obtain a solidified product with very good long-term stability. (3) The barium sulfate thus formed is a hard and compact fine particle. It is non-sticky and hence will not incur aggregation. Further, it can be dispersed readily in the solution so that its transportation, mixing and handling can be accomplished easily. (4) Barium hydroxide has good effects of stabilization on sulfate ions, regulation of pH and lowering corrosion of the waste solution.

The efficiency of wet oxidation is closely related with the control of pH of the reaction solution. Experimental results obtained from the invention indicate that the effect obtained by using barium hydroxide to regulate pH of the wet oxidation solution is much better than that using sodium hydroxide or ammonium hydroxide in that control of pH is stable, less consumption, and helpful to the reduction of the final waste generation. According to the experimental result of the invention, pH of the wet oxidation solution is preferably controlled at 0.5 to 4 and more preferably at 1 to 3 for cation exchange resins; preferably at 1.5 to 4 and more preferably at 2 to 3.5 for anion exchange resins; and preferably at 1 to 4, and more preferably at 1.5 to 3 for anion-cation mixed ion exchange resins. Controlling pH of the reaction solution in an appropriate range can decrease the consumption of the aqueous hydrogen peroxide. The experimental results of the invention indicated that, the wet oxidation of a resin mixture containing equal volume ratio of anion and cation exchange resins, and controlling of pH at about 2 consumes about 3.2 to 5 liter of 50% aqueous per liter of the mixed ion exchange resins. The lower is the addition rate of the aqueous hydrogen peroxide, the less the consumption rate of hydrogen peroxide will be.

At the end of the wet oxidation, as described above, the amount of the cation exchange resin added into the reaction solution may yield corresponding amount of sulfate as $H_2SO_4$ and/or $(NH_4)_2SO_4$. They can be converted to $BaSO_4$ also through addition of barium hydroxide as shown in following reaction equations:

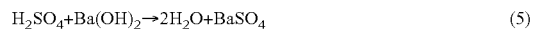

Ammonium hydroxide generated in the above reaction will escape from the solution at pH of more than 8.5, and its escaping rate will be faster as the temperature and pH are higher. Since the conversion is an exothermic reaction, addition of barium hydroxide will increase the temperature and hence favor the escape of ammonia. Based on the experimental results of the invention, it is found that it is more favor for the escape of ammonia as the temperature and pH are higher. In conversion, by adding the amount of barium hydroxide required should be calculated based on the concentration of the barium sulfate to the extent to convert sulfate ion properly into barium sulfate. Excess addition of barium hydroxide will increase the amount of wastes, and besides, will give a too high alkalinity of the waste solution, and will consequently result in an adverse effect on the quality of the solidified product. On the other hand, an insufficient addition amount of barium hydroxide can not convert adequately sulfate salt into barium sulfate and expel ammonia completely such that not only might affect the quality of the solidified product, but also may generate and evolve ammonia gas in the course of solidification or even after, producing adverse effect on the environmental hygiene.

The process according to the invention encompasses a perfect and clean treatment on condensed water containing ammonia and organic carbon on the purpose of not incurring secondary pollution. Of these, upon generation of ammonia gas, it is introduced into an ammonia dissociator where it is decomposed into nitrogen and hydrogen by contacting with a catalyst at an elevated temperature. Hydrogen gas thus produced will be oxidized into H2O as it contacts with air at the outlet of the ammonia dissociator and then is discharged together with the nitrogen gas, wherein the reaction involved is as follows:

For reaction (6), nickel base catalyst has a very good effect. According to the experimental results, nickel oxide loaded on $SiO_2$ or $Al_2O_3$ supports is used as the catalyst, while nickel hydroxide that is converted to nickel oxide upon heating can be used as a catalyst precursor. Heating the catalyst bed to above 600° C. can decompose highly ammonia gas passing it, and decomposes almost completely at temperature of 700° C. As detected by the experiment, at the temperature of 700° C. no ammonia could be detected in the dissociated gas and the concentration of NOx in it is below 50 ppm.

Liquid condensate obtained by cooling vapor from the wet oxidation tank might entrain nuclides, and inevitably contains small amount of organic substances that will increase TOC (Total Organic Carbon) concentration if not subjected to any treatment. This might incur the condensed water not allow to be discharged or brings the difficulty of its recycling. In order to solve this problem, in one embodiment of the invention, after being subjected to a TOC lowering treatment, the condensed water is allowed to pass a bed of ion exchange resins to remove any possible nuclides. The experimental result demonstrated that the condensed water generated according to the invention contains a TOC value between about several tens to several hundreds ppm. The TOC lowering treatment is accomplished by an advanced oxidation method or through addition of peroxide. Of these, the advanced oxidation method comprises of utilizing a combination of ozone with ultraviolet light, while the peroxide includes calcium peroxide, sodium persulfate, horseradish peroxidase and the like. The experimental results indicated that both advanced oxidation method and the addition of peroxide have good effects. After this treatment, the condensed water has an optionally lowered TOC concentration of below several tens or even several ppm, and therefore can be reused or discharged.

The solidification agent used for solidifying wet oxidation liquid waste according to the process of the invention is specially formulated and is composed of cement and pozzolanic materials such as silica fume, fly ash, blast furnace slag powder, as well as, optionally, silicates, phosphates, and oxides or salts of calcium, silicon, magnesium, aluminum, iron, zircon and the like, for ensuring long-term stability and homogeneous quality as well as enhancing operability. Consequently, the solidified product produced by the invention not only exhibits good mechanical strength, freezing and thawing resistance, and water immersion resistance, but also has good long-term stability and homogeneous quality.

The present invention can provide good solution to overcome disadvantages associated with the prior art techniques in that, in addition to eliminate severe corrosion problem, it demonstrates a high volume reducing effect and a quite stable control on operation.

BRIEF DESCRIPTION OF THE DRAWINGS

The drawings disclose an illustrative embodiment of the invention which serves to exemplify the various advantages and objects hereof, and are as follows.

DETAILED DESCRIPTION OF THE PREFERRED EMBODIMENTS

For the invention to be fully understood, the following experimented examples are illustrated in conjunction with the accompanying drawing.

EXAMPLE 1

Figure 1:
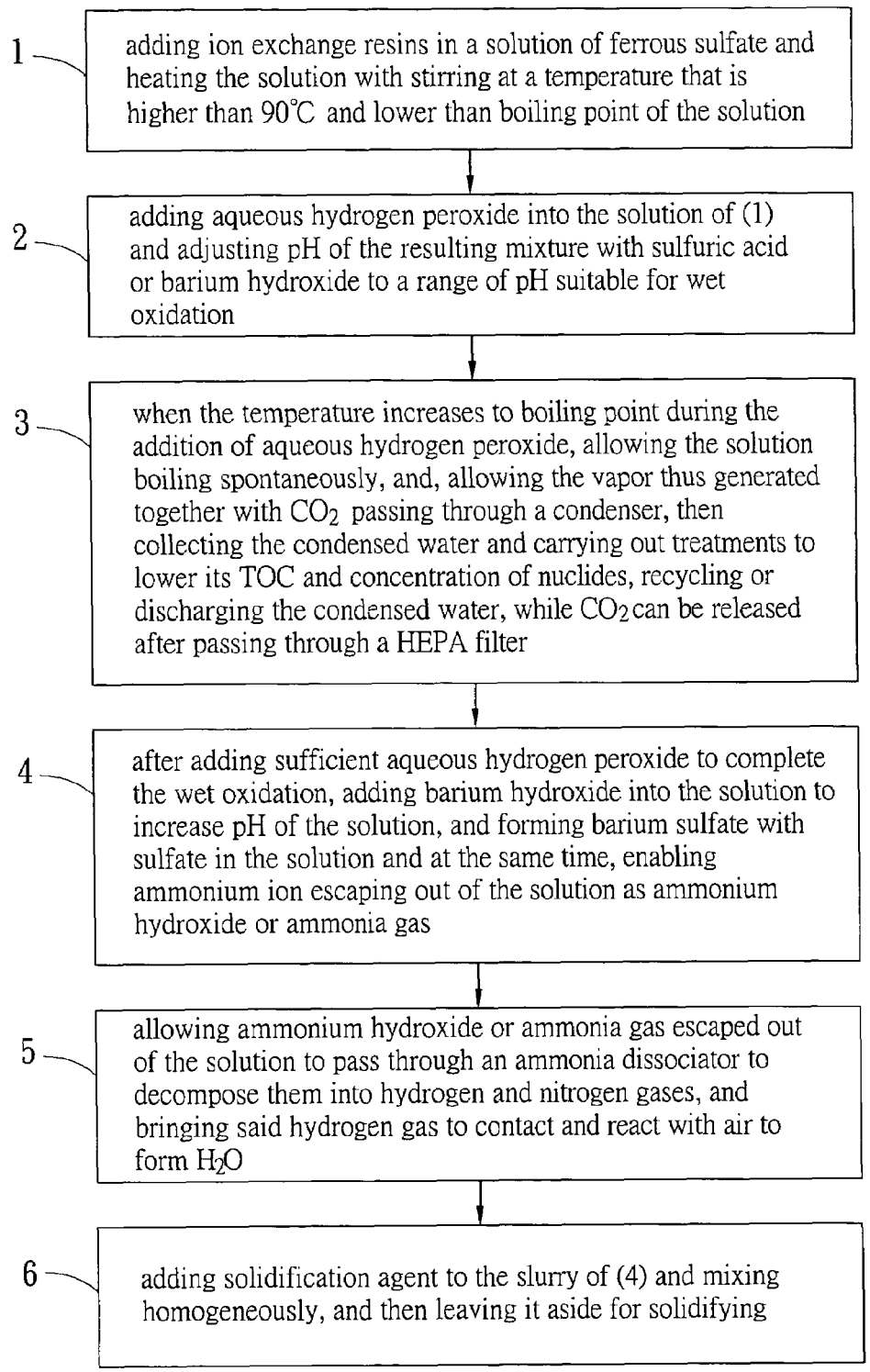
FIG. 1 is a block diagram showing the proceedings of the invention.
Figure 2:
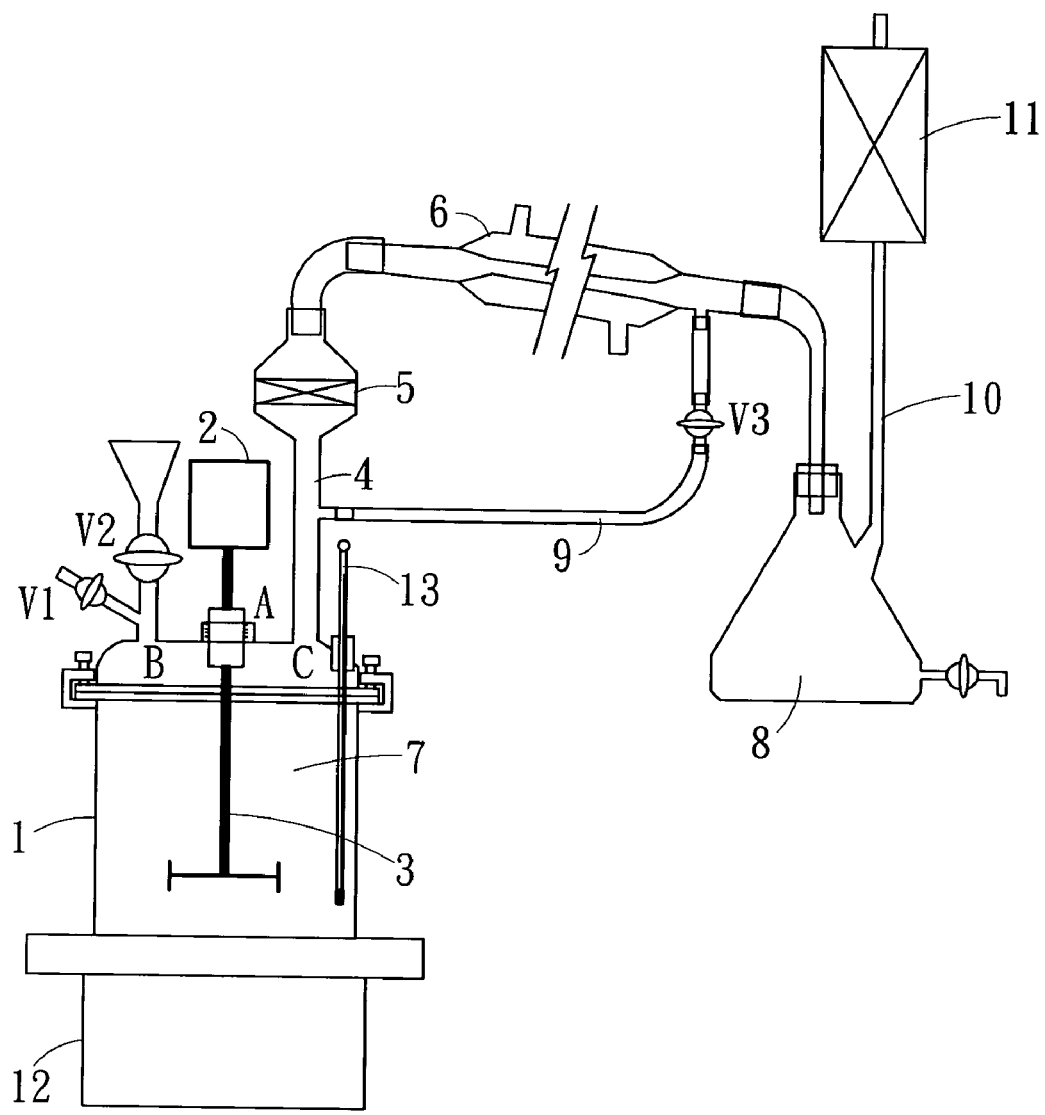
FIG. 2 shows the experimental apparatus for carrying out the process for processing spent ion exchange resins according to the invention.

The experimental apparatus used in this example is composed of, as shown in FIG. 2, a 4,000 ml glass beaker 1 that can be covered with a three-hole glass lid. Of these three holes, the middle hole A is provided with a Teflon stirring blade 3 driven by a motor 2, another hole is used as a feeding port B, and another hole is used as an outlet C. The outlet C is communicated with a refluxing tube 4, a membrane demister 5, and a condenser 6. Gas mixture generated in the wet oxidation emits from the outlet C, and passes through the membrane demister 5 to have water mist contained in that gas mixture removed as large water drop by falling to the refluxing tube 4 and flowing into the reactor 7. On the other hand, as water vapor and carbon dioxide passed through the membrane demister 5 into the condenser 6, water vapor will be cooled and condensed into liquid water that is collected in a receiving bottle 8 and is subjected optionally to treatments such as lowering TOC, removing nuclides and the like, while carbon dioxide is discharged together with other non-condensable gases. At the outlet of the condenser, a Teflon tube 9 is further provided for refluxing of the condensed water. The valve on the Teflon tube 9 can be opened as necessary for allowing the condensed water refluxing to the reaction beaker to adjust the liquid level therein. In FIG. 2, 10 denotes a conduct, 11 an ammonia dissociator, 12 a heater, and 13 a thermometer, while V1, V2 and V3 denote valves.

As the wet oxidation starts to operate, 1,000 ml of 0.06 M ferrous sulfate solution as well as 40 ml (dry weight of 18.05 g) of cation exchange resin (Amberlite 200C, Dow Chemical Co.) and 60 ml (dry weight of 19.88 g) of anion exchange resin (IRA-402, Dowex) were added in this order to the 4,000 ml glass beaker 1, and then concentrated sulfuric acid was added to adjust the initial pH value of the solution to about 2. Thereafter, the beaker was heated on a hot plate and the motor was started to stir the solution. When the temperature of the solution reached 95° C., a metering pump was used to metering 50% aqueous hydrogen peroxide into the beaker at a flow rate of 12.5 ml/min. As soon as the aqueous hydrogen peroxide was metered into the beaker, the temperature of the reaction solution was increased to boiling point. The temperature was then kept at the boiling point. If bubbles were evolved in the course, a proper amount of de-foaming agent (Dow Coming Q2-3447) was added timely to control them. At the same time, barium hydroxide monohydrate powder was added to adjust pH of the solution to 1.9±0.1. If the level of the solution lowered due to evaporation, the valve on the Teflon tube 9 was opened to reflux the water condensate to keep a stable level. 40 ml of cation exchange resin and 60 ml of anion exchange resin as well as 375 ml of aqueous hydrogen peroxide were added every half hour. After addition of the last batch of the resin, enough aqueous hydrogen peroxide was added to a predetermined consumption amount. As the addition was complete, the reaction solution was kept at a temperature between 98° C. and the boiling point for 0.5 hour to allow the aqueous hydrogen peroxide reacted completely. A total of 3.5 kg of resins, 15.375 liter of aqueous hydrogen peroxide, 17.8 g of defoaming agent and 27 g of barium hydroxide monohydrate were added in the whole course of the experiment. After adjusting the volume of the liquid solution to 1000 ml, samples were taken and TOC analysis was carried out for calculating the efficiency of wet oxidation.

Next, the conversion of the sulfate salts in the wet oxidation liquid solution was carried out. At first, 485 g of barium hydroxide monohydrate was added gradually to the resulting solution, stirred, and kept at a temperature of about 98° C. to convert the ammonium sulfate therein into barium sulfate. Ammonia gas was evolved during the addition of barium hydroxide, which was introduced into an ammonia dissociator 10. The ammonia dissociator, containing nickel hydroxide as the decomposition catalyst therein, was heated electrically for keeping at a temperature of 700° C. As gas containing ammonia and ammonium hydroxide passing through the dissociator, ammonia and ammonium hydroxide therein were decomposed into nitrogen and hydrogen gases. This hydrogen gas would contact with air at the outlet and react with oxygen in air into $H_2O$. NOx concentration in the discharged gas yielded in this experiment was detected as below 50 ppm. In this step, original free sulfate ion in the wet oxidation solution was converted into insoluble barium sulfate, while its ammonium ion was converted into ammonia gas and escaped without remaining in the slurry, and was converted, finally, into $N_2$ and $H_2O$. The pH of the resulted slurry is 10.5.

Thereafter, a solidification treatment on the resulted slurry thus obtained was carried out. The slurry was heated to remove excess water for regulating the water content of the slurry such that suitable contents of water and solidification agent were present during solidification. After this concentration treatment, the concentrated slurry had a volume of 734 ml, a weight of 1,208 g, and a water content of 576 g. This concentrated slurry was poured into a separate mixing vessel and it was further added slowly with 757 g of solidification agent (at a ratio of water to solidification agent of 0.76) under the process of stirring. Stirring was continued for 15 minutes to mix homogenously, and then the slurry was poured into a mold made of polyethylene (PE) having an inside diameter of 5 cm and a height of 11 cm. The slurry was solidified in the mold into a cylindrical solidified product. After standing for 28 days, the solidified product was released and both of its ends were cut flush to result in a sample having both flat end surfaces and a diameter of 5 cm and a height of 10 cm. Quality tests such as compressive strength, freezing and thawing, and water immersion were carried on the thus prepared samples according to the test methods of US Nuclear Regulatory Commission (USNRC). Table 1 and 2 list the experimental conditions and the test results.

TABLE 1

Results of wet oxidation of bead ion exchange resins

| Wet oxidation conditions | |
|---|---|
| Volume of cation exchange resins (ml) | 1,400 |
| Volume of anion exchange resins (ml) | 2,100 |
| Dosage of aqueous hydrogen peroxide (ml) | 15,575 |
| Dosage of de-foaming agent (g) | 17.8 |
| Dosage of barium hydroxide used for adjusting pH (g) and expelling ammonia | 27 |
| Wet oxidation results | |
| TOC in ion exchange resins prior to wet oxidation (g) | 738.01 |
| TOC in solution after wet oxidation (g) | 1.45 |
| Oxidation rate of organic carbon (%) | 99.80 |

TABLE 2

Results of solidification experiments on wet-oxidation resulted slurry

| Conditions and results of processing slurry | |
|---|---|
| Dosage of barium hydroxide monohydrate as neutralization agent (g) | 485 |
| Total weight of concentrated slurry (g) | 1,208 |
| Water content of concentrated slurry (g) | 576 |
| Conditions and Results of solidification on concentrated slurry | |
| Dosage of solidification agent (g) | 757 |
| Volume of the solidified product (ml) | 885 |
| Specific gravity of the solidified product | 2.22 |
| Volume ratio of IER/solidified product | 3.95 |
| Compressive strength after standing for 28 days (kg/cm$^2$) | 191 |
| Compressive strength after freezing and thawing test, (kg/cm$^2$) | 242 |

Experimental results demonstrated that no solid residue was present in the wet oxidation solution. TOC of 1.45 g as detected in the solution indicated that the oxidation rate of TOC in ion exchange resins was 99.8%. Volume of the solidified product from the wet oxidation slurry was 885 ml that comprised of 1/3.95 of the original total volume of ion exchange resins (3,500 ml). The compressive strength of the solidified product tested according to the test method specified by USNRC was 191 kg/cm$^2$, and the compressive strength tested after freezing and drawing test was 242 kg/cm$^2$. Both qualities were far much higher than those specified in Technical Position on Waste Forms by USNRC and those required in Qualities Criteria for the Low Level Radioactive Waste Form by the Fuel Cycle and Materials Administration of the Atomic Energy Council, Republic of China and thus indicated excellent mechanical strength, weathering and water resistance.

COMPARATIVE EXAMPLE 1

In comparative example, neutralization agents used in prior art techniques were employed to show the advantage of the process according to the invention over the prior art techniques.

The procedure of the example 1 was repeated, except that calcium hydroxide was used instead of barium hydroxide to regulate pH of the reaction solution during wet oxidation, as well as to increase the pH of the wet oxidation solution for expelling ammonia. During the wet oxidation, pH of the reaction solution was kept at 1.9±0.1; while in the course of solidification, pH of the concentrated slurry was similarly adjusted to be between 9.03 and 9.05 before mixing with the solidification agent. Same conditions as in example 1 were employed to adjust the water content of the concentrated slurry at the time of solidification as well as the ratio of water/solidification agent to become same as that in example 1. Experimental results were shown in Table 3 and 4. It is seen that weight of calcium hydroxide consumed for adjusting pH of the wet oxidation solution was 68.2 g that was 2.5 times the amount when using barium hydroxide (27 g), and was 9 times in term of number of moles. This indicated that control of pH achieved by using barium hydroxide was more stable and effective than that achieved by using calcium hydroxide. Regarding the procession efficiency of the solidification of the concentrated slurry, compressive strength of the solidification products tested according the test method specified by USNRC after standing for 28 days and after freezing and thawing test indicated that solidification products did not possess considerable mechanical strength. The specific gravity of the solidification product was 1.86 that was 84% of the specific gravity (2.22) of the solidification product obtained when using barium hydroxide. The volume of the solidification product was 980 ml that was 1.1 times obtained when using barium hydroxide (885 ml). These indicated that process of the prior art was inferior to the process of the invention in aspects of pH control in operation of the wet oxidation, qualities of the solidification product and the effectiveness of volume reduction.

TABLE 3

Results of the wet oxidation of bead ion exchange resins

| Oxidation conditions | |
|---|---|
| Volume of cation exchange resins (ml) | 1,400 |
| Volume of anion exchange resins (ml) | 2,100 |
| Dosage of aqueous hydrogen peroxide (ml) | 17,500 |
| Dosage of de-foaming agent (g) | 15 |
| Dosage of Ca(OH)$_2$ used for adjusting pH (g) and expelling ammonia | 68.2 |
| Wet oxidation results | |
| TOC in ion exchange resins prior to wet oxidation (g) | 737.94 |
| TOC in solution after wet oxidation (g) | 29.62 |
| Oxidation rate of organic carbon (%) | 79.51 |

TABLE 4

Results of solidification experiments on wet-oxidation resulted slurry

| Conditions and results of processing slurry | |
|---|---|
| Dosage of Ca(OH)$_2$ as neutralization agent (g) | 56.8 |
| Total weight of concentrated slurry (g) | 1066 |
| Water content of concentrated slurry (g) | 576 |
| Condition and results of solidifying concentrated slurry | |
| Dosage of solidification agent | 757 |
| Volume of solidification product (ml) | 980 |
| Specific gravity of solidification product | 1.86 |
| Ratio of IER volume/volume of solidification product | 3.57 |
| Compressive strength after standing for 28 days (kg/cm$^2$) | 0 |
| Compressive strength after freezing and drawing test, (kg/cm$^2$) | 28.6 |

COMPARATIVE EXAMPLE 2

The procedure of comparative example 1 was repeated, except that NaOH was used instead of Ca(OH)$_2$. Experimental results were listed in Table 5 and 6. In this comparative example, sulfate salt produced was Na$_2$SO$_4$, a highly water soluble compound. In order to stabilize effectively Na$_2$SO$_4$ during solidification, in addition to the same conditions used in example 1 (experiment 1), another experiment (experiment 2) was carried out particularly, wherein, at the time of solidifying the concentrated slurry, the water content was increased from 576 g to 950 g for ensuring that, during solidifying the concentrated slurry, Na$_2$SO$_4$ could react in its dissolved state with the solidification agent and hence form more stable (i.e., low water solubility) sulfate so as to prevent Na$_2$SO$_4$ from forming crystals and subsequently becoming embedded within the solidification product which might render the stabilization reaction impossible and hence might result in deterioration of qualities of the solidification product in contacting moisture or in changing of temperature and humidity.

In experiment 1, weight of sodium hydroxide consumed for adjusting pH of the wet oxidation solution was 68.7 g that was 2.54 times the amount when using barium hydroxide (27 g), and was 12 times in term of number of moles. This indicated that control of pH achieved by using sodium hydroxide was likewise inferior to that achieved by using barium hydroxide. The volume of the solidification product was 967 ml that was about 10% more than that obtained in example 1 (885 ml). Compressive strength of the solidification products tested after standing for 28 days was 55 kg/cm$^2$ that was far less than that obtained in example 1 (191 kg/cm$^2$). The compressive strength after freezing and thawing test was 32.4 kg/cm$^2$. These indicated likewise that this solidification product was inferior to example 1 in aspects of pH control, the effectiveness of volume reduction and qualities of the solidified product.

In experiment 2, weight of sodium hydroxide consumed for adjusting pH of the wet oxidation solution was 88.1 g that was higher than that used in experiment 1. Compressive strength of the solidified products tested after standing for 28 days was 155 kg/cm$^2$, that, though better than experiment 1, but was inferior to that obtained in example 1 (191 kg/cm$^2$). The compressive strength after freezing and thawing test was 108.5 kg/cm$^2$, though again better than experiment 1, but was far less than that of the solidified product obtained in example 1 (191 kg/cm$^2$). The volume of solidification products was 1,300 ml, about ⅓ larger than that of experiment 1, and about ½ larger than that of using barium hydroxide in example 1.

Under comparison of the above experiments, it can be confirmed that the process of the invention can obtained better results than those obtained by any prior art processes regarding the control of reaction conditions during wet oxidation, the effectiveness of volume reduction, as well as qualities of the solidified product and the like.

TABLE 5

Results of wet oxidation of bead ion exchange resins

| | Run No. | |
|---|---|---|
| | 1 | 2 |
| Wet oxidation conditions | | |
| Volume of cation exchange resins (ml) | 1,400 | 1,400 |
| Volume of anion exchange resins (ml) | 2,100 | 2,100 |
| Dosage of aqueous hydrogen peroxide (ml) | 17,500 | 17,500 |
| Dosage of de-foaming agent (g) | 21 | 12.96 |
| Dosage of NaOH used for adjusting pH (g) and expelling ammonia | 68.7 | 88.1 |
| Wet oxidation results | | |
| TOC in ion exchange resins prior to reaction (g) | 737.94 | 737.94 |
| TOC in solution (g) | 30.27 | 20.77 |
| Oxidation rate of organic carbon (%) | 80.77 | 93.44 |

TABLE 6

Results of solidification experiments on wet-oxidation resulted slurry

| | Run No. | |
|---|---|---|
| | 1 | 2 |
| Conditions and results of processing slurry | | |
| Dosage of NaOH as neutralization agent and expelling ammonia (g) | 49.2 | 45.4 |
| Total weight of concentrated slurry (g) | 1018 | 1237 |
| Water content of concentrated slurry (g) | 576 | 950 |
| Conditions and Results of solidification on concentrated slurry | | |
| Dosage of solidification agent | 757 | 1251 |
| Volume of solidification product (ml) | 967 | 1300 |
| Specific gravity of solidification product | 1.84 | 1.91 |
| Volume Ratio of IER/solidification product | 3.62 | 2.692 |
| Compressive strength after standing for 28 days (kg/cm$^2$) | 55 | 155 |
| Compressive strength after freezing and drawing test (kg/cm$^2$) | 32.4 | 108.5 |

Under comparison of the above experiments, it can be confirmed that the process of the invention can obtained better results than those obtained by any prior art process regarding the control of reaction conditions during wet oxidation, the effectiveness of volume reduction, qualities of the solidified product and the like.

The forgoing illustrates only part of embodiments according to the invention, and is not intended to limit the scope of the invention thereto. When carrying out based on the disclosure disclosed above, expected objects of the invention can be achieved. The invention thus provides a process for processing spent ion exchange resins, which can reduce the volume of the spent ion exchange resins by wet oxidation and can solidify the wet oxidation residue and slurry with high efficiency, and thus meets the requirement of commercial uses.

Many changes and modifications in said described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for processing spent ion exchange resins, comprising the following steps:
   (1) adding ion exchange resins in a solution of ferrous sulfate and heating the solution with stirring at a temperature between 90° C. and the boiling point of the solution;
   (2) adding aqueous hydrogen peroxide in the solution of (1) and adjusting pH of the resulting mixture with sulfuric acid and barium hydroxide to a range of 0.5 to 4.0 suitable for wet oxidation;
   (3) after adding sufficient aqueous hydrogen peroxide to complete the wet oxidation, adding barium hydroxide in the solution to increase pH of the solution, and forming barium sulfate with sulfate in the solution and at the same time, enabling ammonium ion to escape out of the solution as ammonium hydroxide or ammonia gas; and
   (4) after concentrating the slurry obtained in (3) and cooling, mixing with solidification agent homogeneously, and then leaving the resultant slurry standing aside for solidifying.

2. The method as described in claim 1, wherein said ion exchange resins in step (1) is a cation exchange resin, anion exchange resin or mixture of both.

3. The method as described in claim 1, wherein said ion exchange resin is being a cation exchange resin, in the range of 1.5 to 4 in case of anion exchange resin, and in the range of 1 to 4 in case of a mixture of both cation and anion exchange resins.

4. The method as described in claim 1, wherein the temperature of the concentrated slurry containing barium sulfate in step (4) is below 40° C. at the moment of adding solidification agent.

5. The method as described in claim 1, wherein said solidification agent used in the step (4) is selected from cement, silica fume, fly ash, blast furnace slag powder, silicates, phosphates, and, optionally, oxides or salts of calcium, silicon, magnesium, aluminum, iron, and zircon.

6. The method as described in claim 4, wherein said solidification agent used in the step (4) is selected from cement, silica fume, fly ash, blast furnace slag powder, silicates, phosphates, and, optionally, oxides or salts of calcium, silicon, magnesium, aluminum, iron, and zircon.

7. A method for processing spent ion exchange resins, comprising the following steps: (1) adding ion exchange resins in a solution of ferrous sulfate and heating the solution with stirring at a temperature in a range between 90° C. and the boiling point of the solution; (2) adding aqueous hydrogen peroxide in the solution of (1) and adjusting pH of the resulting mixture with sulfuric acid and barium hydroxide to a range of 0.5 to 4.0 suitable for wet oxidation; (3) when the temperature increases to boiling point during the addition of aqueous hydrogen peroxide, allowing the solution boiling spontaneously, and, allowing the vapor thus generated together with $CO_2$ passing through a condenser, then collecting the condensed water and recycling or discharging the condensed water, while emitting $CO_2$ after filtering; (4) after adding sufficient aqueous hydrogen peroxide to complete the wet oxidation, adding barium hydroxide in the solution to increase pH of the solution, and forming barium sulfate with sulfate in the solution and at the same time, enabling ammonium ion escaping out of the solution as ammonium hydroxide or ammonia gas; (5) allowing ammonium hydroxide or ammonia gas escaped out of the solution to pass through an ammonia dissociator to decompose them into hydrogen and nitrogen gases, and bringing said hydrogen gas to contact and react with air to form $H_2O$; and (6) adding solidification agent in the slurry of (4) and mixing homogeneously, and then leaving it standing aside for solidifying.

8. The method as described in claim 7, wherein said ion exchange resin in step (1) is cation exchange resin, anion exchange resin or mixture of both.

9. The method as described in claim 7, wherein said ion exchange resin is a cation exchange resin, in the range of 1.5 to 4 in case of anion exchange resin, and in the range of 1 to 4 in case of a mixture of both cation and anion exchange resin.

10. The method as described in claim 7, wherein treatment for lowering total organic carbon (TOC) concentration of the condensed water in step (3) is conducted by adding a peroxide, or by adding a peroxide in combination with irradiation with ultraviolet light.

11. The method as described in claim 7, wherein treatment for decreasing the concentration of nuclides in the condensed water in step (3) is conducted by passing said solution through a bed of ion exchange resins.

12. The method as described in claim 7, wherein the operation temperature for the decomposition of ammonia is between 600° C. and 800° C.

13. The method as described in claim 7, wherein the temperature during adding solidification agent into said concentrated slurry containing barium sulfate in the step (6) is below 40° C.

14. The method as described in claim 7, wherein the solidification agent used in the step (6) is selected from cement, silica fume, fly ash, blast furnace slag powder, silicates, phosphates and oxides or salts of calcium, silicon, magnesium, aluminum, iron and zircon.

* * * * *